US006200363B1

United States Patent
Whitten, Jr. et al.

(10) Patent No.: US 6,200,363 B1
(45) Date of Patent: Mar. 13, 2001

(54) DIRECT REDUCED IRON HOT/COLD DISCHARGE SYSTEM

(75) Inventors: Gilbert Y. Whitten, Jr., Mooresville; James M. McClelland, Jr., Cornelius; Gary E. Metius, Charlotte, all of NC (US)

(73) Assignee: Midrex International B.V. Rotterdam Zurich Branch, Zurich (CH)

( * ) Notice: Subject to any disclaimer, the term of this patent is extended or adjusted under 35 U.S.C. 154(b) by 0 days.

(21) Appl. No.: 09/415,399

(22) Filed: Oct. 8, 1999

Related U.S. Application Data

(60) Provisional application No. 60/103,666, filed on Oct. 9, 1998, and provisional application No. 60/114,126, filed on Dec. 30, 1998.

(51) Int. Cl.⁷ .................................................. C21B 11/02
(52) U.S. Cl. ............................................. 75/488; 266/195
(58) Field of Search ............................... 266/45, 182, 195, 266/198, 155, 156; 75/490, 495, 505, 433, 488

(56) References Cited

U.S. PATENT DOCUMENTS

| | | | |
|---|---|---|---|
| 5,296,015 | * | 3/1994 | Becerra-Novoa et al. ............. 75/433 |
| 5,445,363 | * | 8/1995 | Becerra-Novoa et al. ........... 266/182 |
| 5,447,550 | * | 9/1995 | Leal-Cantu et al. .................. 75/379 |
| 5,858,057 | * | 1/1999 | Celada-Gonzalez et al. ......... 75/490 |
| 6,039,916 | * | 3/2000 | Celada-Gonzalez et al. ....... 266/155 |

* cited by examiner

Primary Examiner—Scott Kastler
(74) Attorney, Agent, or Firm—Dougherty & Clements LLP

(57) ABSTRACT

A method and apparatus for discharging cold product or a combination of cold and hot products from a continuous supply of hot direct reduced iron ("DRI") comprising a product cooler connected to a shaft furnace, with downward movement of the hot DRI and upward concurrent flow of cooling gas through the product cooler. The method and apparatus provides for diverting of hot DRI from an upper portion of the cooler for gravitational transfer to an adjacent storage unit located at a lower elevation than the furnace. The product cooler is situated at a lower height in relation to the furnace, for gravity transfer of a continuous supply of hot DRI through an entry point into the cooler. Cooler provides for cooling gas injection into the lower portion of the cooler, with gas flow upward and counter-current to the hot DRI that descends through the cooler. Recovered cooling gas is scrubbed, cooled, and recycled back for injection into the bottom portion of the cooler. The cooled DRI is removed from the bottom portion of the cooler thereby establishing a gravitational movement of DRI through the cooler. Simultaneous to cooling of the DRI material, separate transfer portions of hot DRI material can be diverted at the top of the cooler with gravitational transfer to one or more adjacent storage units for processing.

15 Claims, 2 Drawing Sheets

DIRECT REDUCED IRON HOT/COLD DISCHARGE SYSTEM

CROSS REFERENCE TO RELATED APPLICATIONS

This application claims the benefit of U.S. Provisional Application Ser. No. 60/103,666 filed on Oct. 9, 1998 and U.S. Provisional Application Ser. No. 60/114,126 filed on Dec. 30, 1998.

FIELD OF THE INVENTION

The present invention relates to a method and apparatus for the production of metallic iron, formed in a shaft furnace, and more particularly to a method and apparatus for simultaneously discharging hot iron material and cold iron material from a continuous supply of hot direct reduced iron ("DRI").

BACKGROUND OF THE INVENTION

Sponge iron, metallized pellets, briquettes, lump, or reduced metal materials such as DRI are produced by the direct reduction of ores or metal oxides. Large quantities of metallized iron pellets are made in the direct reduction process wherein particulate iron oxide is reduced substantially to metallic iron by direct contact with a reducing gas such as a mixture of hydrogen and carbon monoxide without becoming liquid. Throughout this specification and appended claims, the term "metallized pellets" is intended to include metal-bearing pellets such as sponge iron, pellets, lumps, briquettes, DRI or other compacted forms of reduced metal and the like which contain at least 80 percent of their metal in the metallic state with the balance substantially in the form of metallic oxides. Metallized in this sense does not mean coated with metal, but means nearly completely reduced to the metallic state. For ease of discussion and visualization, the majority of this specification will describe the invention as it relates to DRI, although it should be understood that the invention will work equally well with other forms of metallized pellets.

A problem associated with the use of hot DRI to make steel or other products is its inherent tendency to oxidize upon exposure to air or water. Throughout this specification, hot DRI refers to material at a temperature in excess of 650° C., and cold DRI refers to material at a temperature less than 100° C. Exposure of a mass of hot active DRI to atmospheric air and moisture causes oxidation of the metal ("rusting") with a significant loss of metallization. The oxidation also produces heat that can dramatically raise the temperature of a mass of DRI. The process of rusting also releases water bound hydrogen into the immediate environment. Under certain conditions, the hot DRI can ignite the liberated hydrogen resulting in additional heat, release of additional hydrogen, and possibly an explosion.

DRI must be removed from the furnace in which it is produced in order to be further processed into steel or other end products. Therefore methods are needed to transport DRI while reducing the risk of oxidation. One method is to cool the DRI to a sufficiently low temperature to prevent the ignition of hydrogen. One drawback to this method is that DRI production systems are typically designed to be "all or nothing" propositions with respect to cooling. Either all of the DRI out of a particular furnace is cooled or none of it is cooled. Given the need for both hot DRI, for example as an energy efficient feed to a steelmaking process, and cool DRI, a need exists for an apparatus and method for taking the output from a shaft furnace and providing both hot and cold DRI for subsequent use.

The problem addressed by this invention has been addressed in U.S. Pat. No. 5,296,015 in which hot DRI is separated into cool DRI and hot DRI. Gas is used to cool DRI descending from a reduction furnace. Initially, the cooling gas is air, however, the gas is recirculated in a hermetic closed system and the oxygen content is quickly removed by reaction with the hot DRI. Thereafter, the recirculated gas is predominately nitrogen with low partial pressure of oxygen and water vapor. The DRI cooler uses a gas recirculation system in which cooling gas is introduced into the lower portion of the container and flows counter-currently to the flow of the DRI. When the DRI is desired, the gas recirculation system is operated and the material is transferred from the lower portion of a bin with a conical lower part by pneumatically transporting the material. The pneumatic transportation is carried out with carrier gas velocities in the range of 9 to 35 m/s at a pressure of 5 kg/cm$^2$ and a mass to carrier ratio of between 7 and 25. The cooled DRI is removed to storage means for later use as feed stock for various purposes. When hot DRI is wanted, for example to directly fed an electric melter, the cooling gas does not circulate through the descending DRI material. Again the material is conveyed pneumatically to an end use, for example, an electric melter. Unfortunately, the patented invention fails to anticipate the need for a method and apparatus to simultaneously provide sources of hot and cooled DRI, establishing hot DRI routing by operation of various gates and valves and then sending the furnace output pneumatically to the place for end use of hot DRI, for example, a melter. Additionally, this method uses relatively high gas velocities (22 m/s typical) with concomitant requirements for compressors and scrubbers with increased energy use for the same throughput of material. Moreover, using a gas as a carrier implies solid material circulating through the distribution system at velocities approaching the carrier gas velocities. Although the invention asserts that using a tee-connector at elbow turns ameliorates abrasion there, the patented method implies erosion of the containment structures used to move the material.

SUMMARY OF THE INVENTION

The present invention provides a method and apparatus for taking a continuous output from a direct reduction furnace and simultaneously providing hot DRI material for subsequent steps of melting, briquetting, and transport to storage, as well as providing cold DRI material for storage or other use. The Midrex method and apparatus for direct reduction are disclosed in U.S. Pat. No. 3,748,120 entitled "Method of Reducing Iron Oxide to Metallic Iron," U.S. Pat. No. 3,749,386 entitled "Method for Reducing Iron Oxides in a Gaseous Reduction Process," U.S. Pat. No. 3,764,123 entitled "Apparatus for Reducing Iron Oxide to Metallic Iron," U.S. Pat. No. 3,816,101 entitled "Method for Reducing Iron Oxides in a Gaseous Reduction Process," and U.S. Pat. No. 4,046,557 entitled "Method for Producing Metallic Iron Particles," which are hereby incorporated by reference.

Applicants have invented an efficient apparatus and method to simultaneously provide both hot and cold DRI from a continuous gravity-fed supply of hot DRI material, as from a Midrex method, direct reduction furnace. The apparatus comprises a product cooler situated in close proximity and at lower height in relation to a furnace, for gravitationally receiving within the product cooler a continuous supply of hot DRI material from a direct reduction furnace through an entry point. The product cooler provides a cooling gas injection, recovery and recycling system, where cooling gas is injected into the lower portion of the product cooler, the gas flows upward and counter currently to the hot DRI material descending through the product cooler, and the gas is collected by gas collectors at the top of the product cooler. The recovered cooling gas is then scrubbed, cooled, and recycled back to the injection point. The DRI is removed from the bottom portion of said product cooler thereby establishing a gravitational movement of DRI through the product cooler.

At least one hot DRI storage unit is situated apart from said cooler and below the entry point to the product cooler. The at least one hot DRI storage unit is hermetically connected to the top portion of said product cooler adjacent the entry point to said product cooler by a transfer pipe. In a preferred embodiment, the transfer pipe forms an acute angle with the horizontal plane of the top of the product cooler thereby providing for the gravitational transfer of hot DRI directly from the top portion of the product cooler to the hot DRI storage unit. The percentage of hot DRI leaving the furnace that is transferred to the hot DRI storage unit is adjustable through use of a valves and/or dampers at the entry of the transfer pipe and in the gas recirculation system. The transfer pipe has a plurality of gas jets located in a lower portion of the pipe, with the jets injecting cooling gas into the lower portion to assist concurrent flow of hot DRI material through the transfer pipe. In this manner, the above described apparatus is able to provide a continuous stream of both hot and cold DRI material, simultaneously and with short transit times into the at least one DRI storage unit.

OBJECTS OF THE INVENTION

The principal object of the invention is to provide a method for the simultaneous production of hot DRI material and cold DRI material.

It is another object of the invention to provide an apparatus for transfer of hot DRI material to storage without significant energy requirements, with simultaneous and separate transfer and cooling of DRI material from a furnace.

BRIEF DESCRIPTION OF THE DRAWINGS

The foregoing and other objects will become more readily apparent by referring to the following detailed description and the appended drawings in which.

DETAILED DESCRIPTION

Figure 1:
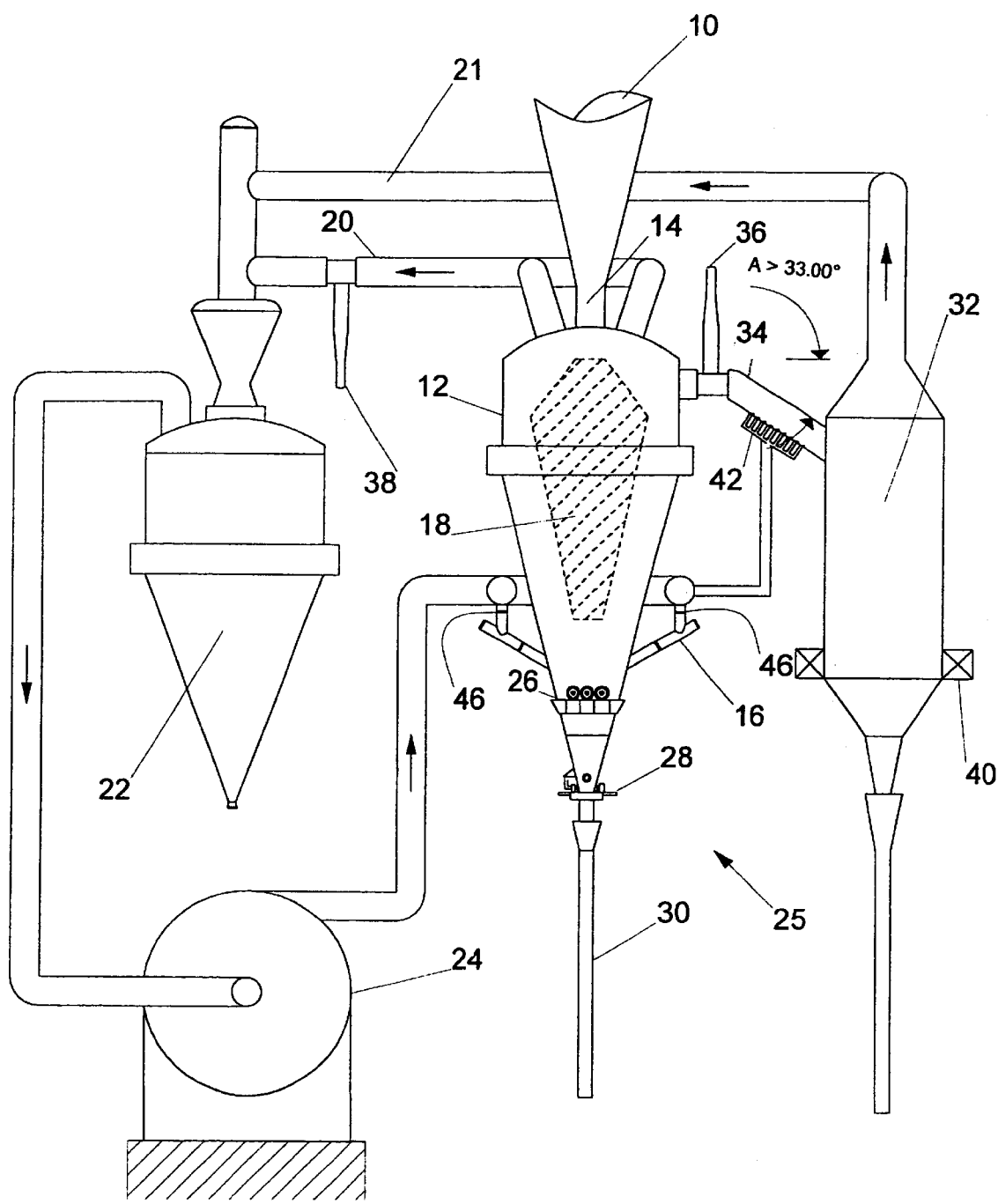
FIG. 1 is a schematic drawing of an apparatus implementing the preferred embodiment for the simultaneous production of hot DRI material and cooling of cold DRI material.

Referring now to FIG. 1, hot DRI material at temperatures of approximately 650° C. to 850° C. is fed preferably continuously from a source such as a hot DRI furnace 10 to a product cooler 12 through hermetically sealed feed leg 14. Cooling gas distributor 16 injects cooling gas which is a gas with very low partial pressure of oxygen and water vapor (for example nitrogen or argon) into the bottom portion of product cooler 12. The cooling gas is received at the gas distributor 16 by piping of cooling gas from a cooling gas compressor 24. The compressor receives cooling gas from scrubber 22 that contains means to remove unwanted contamination from the gas and means to reduce the gas temperature. The cooling gas travels upward, countercurrently to the downward falling hot DRI material. The ascending cooling gas and the descending hot DRI travel through an annulus defined by flow aid 18 and the interior shell of product cooler 12. The flow aid 18 distributes the downward flow of hot DRI material to allow ample mixing with the upward flow of cooling gas. Heated cooling gas, collected at the top area of the product cooler 12, leaves product cooler 12 through top gas duct 20. The arrows indicate the direction of gas flow.

The heated cooling, gas is then directed by piping 20 to a cooling gas scrubber 22 that cleans and cools the gas. The cleaned and cooled cooling gas is then compressed by a compressor 24 and sent back to product cooler 12 to the gas distributor 16 for injection into the bottom of the product cooler 12. Product cooler 12 is constructed to have sufficient capacity to cool the entire product materials from hot DRI furnace 10 as the product materials descend downward through the product cooler 12, with hot DRI material flow limited by the diameter of the feed leg 14. The feed leg 14 serves as the entry point of hot DRI material into the upper portion of the product cooler 12.

The bottom or outlet 25 configuration of product cooler 12 is similar to the bottom of a Midrex cold discharge furnace having middle and lower burden feeders 26 and 28, a seal leg 30, and a discharge device (not shown). The middle burden feeder 26 is oriented at a lower end of the product cooler 12 and below the flow aid 18 inside the product cooler 12. Below the feeder 26 is a lower burden feeder 28 that has a diminishing diameter as compared to the middle feeder 26 and the largest diameter of the product cooler 12. The burden feeders 26, 28 direct the cooled DRI material downward and through the seal leg 30 for discharge of the cooled DRI to a discharge outlet device.

Hot DRI material can be diverted to at least one hot DRI storage unit 32, by gravitationally transferring a portion of the hot DRI material before it enters the product cooler 12, through transfer piping 34. The gravitational transfer of a transfer portion of hot DRI material from the entry point at the feed leg 14 of the product cooler 12 to hot DRI storage unit 32 is accomplished by connecting the product cooler 12 to the hot DRI storage unit 32 by a downward angled transfer pipe 34. Transfer pipe 34 is so situated that it forms an acute angle A with the horizontal as shown in FIG. 1. While any angle downward from the horizontal would provide a gravitational force to assist the transport of the DRI product, angles equal to or greater than approximately thirty-three degrees are preferred for this invention. If lesser angles are used the frictional forces of the hot DRI material within the transfer pipe 34 tend to offset gravitational forces and stop the flow of DRI product through the transfer pipe 34 or require greater gas pressure since the burden of moving the material falls on the gas as a transport medium. The transfer pipe 34 can have a plurality of injection gas jets 42 located in the lower surfaces of the transfer pipe 34 to allow gas to be injected into the lower area of the pipe to assist with flow of hot DRI material downward through the transfer pipe 34 by minimizing friction effects.

The transfer pipe 34 is connected to the product cooler 12 adjacent to the entry point to the product cooler. At least two transfer pipes 34, may be connected to the entry point for transfer of hot DRI material to a first storage unit 32, connected to pipe 32, and to a second storage unit (not shown), symmetrically connected to a second pipe (not shown). A valve or slide gate 36 controls the opening to transfer pipe 34. By adjusting slide gate 36, in inverse relation to slide gate or damper 38 the percentage of hot DRI material leaving the furnace 10 that is transferred to the product cooler 12 can be varied. The inverse relationship between the slide gates 36 and 38 is not critical since the function is diversion of the incoming material, not transport thereof. The velocity of the portion of the cooling or inert gas blown through transfer pipe 34 is approximately less than 7 m/s. Hot DRI storage unit 32 rests on load cells 40 to monitor the storage unit 32 filling rate and remaining capacity.

Several factors may work to hinder the transfer of DRI product through the transfer pipe 34. The size, shape and quantity of hot DRI product transferred; the magnitude of angle A; the coefficient of friction between the DRI product and the transfer pipe 34; may all combine to restrict or stop the flow of DRI product through transfer pipe 34. Therefore, it may be advantageous to add a mechanism to assist the flow of DRI product through the transfer pipe 34 to minimize the transfer time of the hot DRI for receipt of the hot DRI into the storage unit 32 with minimal heat loss by contact with associated transfer piping.

Figure 2:
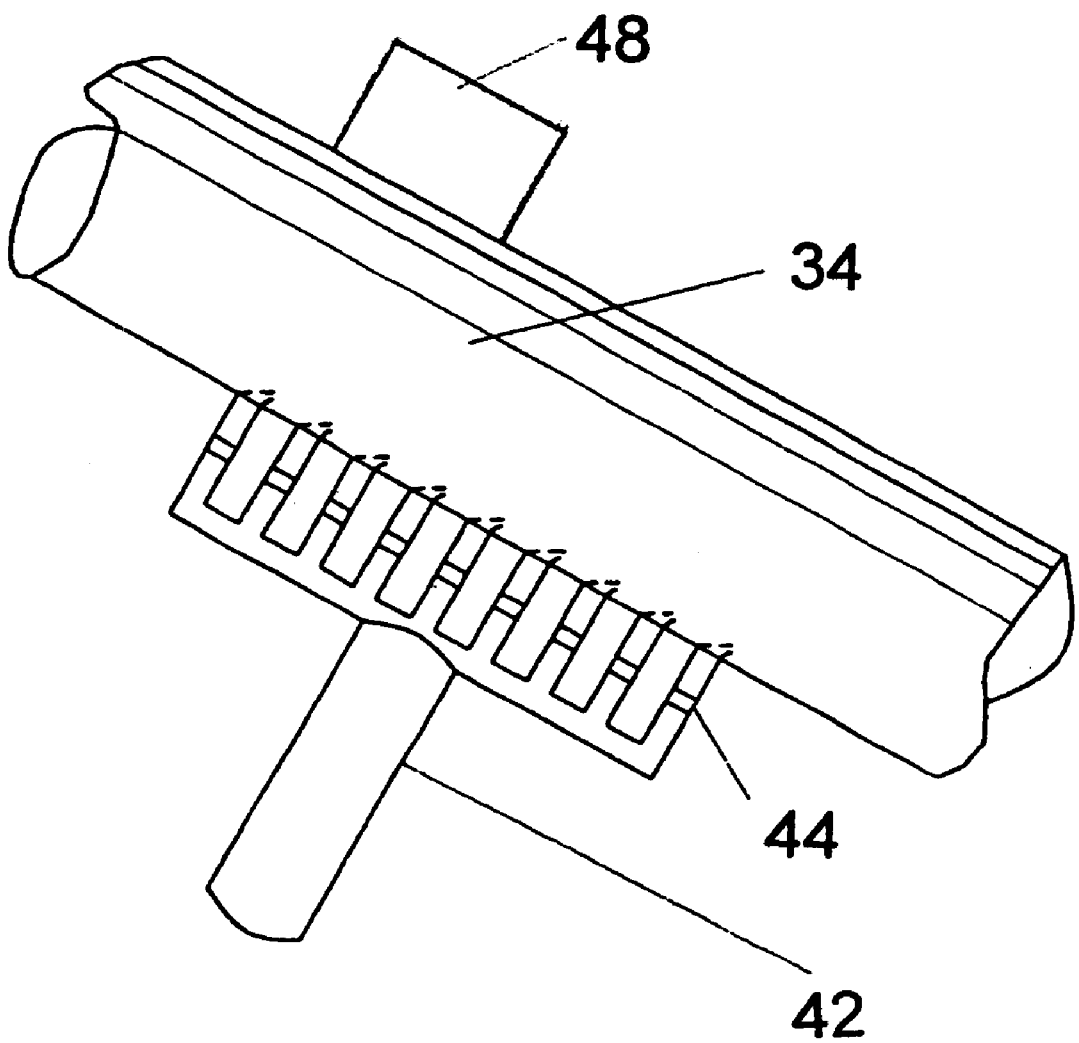
FIG. 2 is an exploded view of a schematic drawing of transfer piping with gas injection.

Referring to FIG. 2, additional assistance can be provided to ensure relatively constant gravitational flow of DRI product through transfer pipe 34, by injecting low-oxygen containing gas into transfer pipe 34 via a plurality of gas jets 44 located along the lower length of transfer pipe 34. The plurality of gas jets 44 are located in and through the lower sides or bottom surface of the transfer pipe 34, with the jets 44 spaced along the length of the transfer pipe 34. The injected gas can move along the bottom interior walls of the pipe 34, providing a fluid-like cushion of gas for hot DRI to be placed on, when the hot DRI material is transferred by the adjusting slide gate 36, into the upper opening of the transfer pipe 34. In the preferred embodiment, the velocity of gas flowing through transfer pipe 34 should be approximately 7 meters per second or less. The injected gas serves as a flow media underneath the hot DRI material moving through the pipe 34, reducing the friction between the hot DRI materials undergoing transfer and the lower interior surface of the transfer piping, which increases the efficiency of hot DRI material transfers to storage unit(s) 32. Additionally, a vibrating mechanism 48 may be attached to transfer pipe 34 to vibrate the pipe 34 to aid the flow of hot DRI product along and through the pipe 34.

DESCRIPTION OF THE METHOD

The method of operation includes transporting and cooling of hot DRI material from a furnace for storage or use, comprising the steps of discharging the hot DRI material from a shaft furnace into a product cooler at an entry point located below the shaft furnace, transferring a transfer portion of the hot DRI material at the entry point to a storage point exterior to the product cooler. The storage point can be below the shaft furnace, with the transferring step accomplished by establishing a gravitational flow of hot DRI through a transfer pipe hermetically connected at a downward-sloping angle from the entry point of the product cooler to the storage point. The method includes a step of allowing a portion of the hot DRI material directly into the product cooler. This portion is separate from the transfer portion. This descending portion falls through the product cooler to a bottom portion of the product cooler, having been propelled by gravity. The method also includes a step of injecting cooling gas that is chemically inert with respect to the hot DRI at the bottom portion of the product cooler. The injected cooling gas moves upward and through the product cooler and circulates upward and through the descending portion of the hot DRI material. The cooling gas is removed in a removing step near the top of the product cooler, with the cooling gas directed from the removing step to a cooling gas scrubber that provides cooling of the gas for use in the injecting step. An additional step includes removing cooled DRI material from the bottom portion of the product cooler. An additional step includes hermetically removing hot DRI material from the hot DRI storage units.

SUMMARY OF THE ACHIEVEMENT OF THE OBJECTS OF THE INVENTION

From the foregoing, it is readily apparent that we have invented an improved method and apparatus for simultaneously discharging hot DRI material and cold DRI material from a shaft furnace. The improved method and apparatus provide for transport of hot DRI material in pellet, nugget, briquette, or other large sizes for melting, briquetting, or storage, and transfer of cold DRI material to storage. Numerous advantages of the improved method and apparatus include the time of transfer of hot DRI material to storage units is minimized by utilizing short pathways with gravity-fed transfers. The short transfer pathways do not require significant additional power requirements for transfer of hot DRI materials other than the energy required to inject gases within and along the lower surface of the relatively short length of transfer piping. The benefit of the short transfer pathways is that the temperature of the hot DRI, as delivered to storage units, is increased, with a minimizing of heat loss due to contact with the surface area of longer sections of conveying piping of prior conveyance systems. An additional benefit of the short transfer pathways is the minimized degradation of the sizing of hot DRI nuggets and briquettes, and/or the sizing of cold DRI material, due to less handling and minimal conveyance of materials through long sections of conveying piping. The short transfer pathways of the current invention diminish the number of pipes, valves, and heaters needed for transfer of hot DRI materials, which reduce overall maintenance costs related to replacement of worn parts within the transfer system.

It is to be understood that the foregoing description and specific embodiments are merely illustrative of the best mode of the invention and the principles thereof, and that various modifications and additions may be made to the apparatus by those skilled in the art, without departing from the spirit and scope of the appended claims.

What is claimed is:

1. Apparatus for the simultaneous discharge of hot direct reduced iron (DRI) material and cold DRI material from a continuous supply of hot DRI comprising:

A continuous supply of hot DRI;

a product cooler connecting with said continuous supply of hot DRI for gravitationally receiving hot DRI from said supply, said product cooler having an upper portion and a bottom portion and an entry point in said upper portion for receiving hot DRI from said continuous supply;

means for introducing cooling gas into said bottom portion of said product cooler, means for moving said cooling gas upward through said product cooler;

a recovery and recycling system connected to said product cooler for collecting and recycling used cooling gas removed from said upper portion of said product cooler;

means for removing cold DRI material from the bottom portion of said product cooler thereby establishing a gravitational movement of hot DRI material through said product cooler;

at least one hot DRI storage unit situated apart from said product cooler, said hot DRI storage unit being hermetically connected to said upper portion of said product cooler by a transfer pipe, said transfer pipe forming a downward acute angle with the horizontal plane of said entry point thereby providing for the gravitational transfer of hot DRI directly from said product cooler entry point to said hot DRI storage unit; and means for hermetically removing hot DRI material from the bottom portion of said hot DRI storage unit thereby establishing a gravitational transfer of a portion of the hot DRI material for further use.

2. Apparatus according to claim 1, wherein said introducing means comprises injectors for introducing said cooling gas into said bottom portion of said product cooler and piping for directing said cooling gas from said recovery and recycling system to said injectors.

3. Apparatus according to claim 2, wherein said recovery and recycling system further comprises:

a cooling gas scrubber, said cooling gas scrubber having an intake and an exit;

a plurality of piping, said plurality of piping connected to said upper portion of said product cooler with said intake of said cooling gas scrubber, and said plurality of piping connecting said exit of said cooling gas scrubber with said bottom portion of said product cooler;

a top gas duct in said upper portion of said product cooler, said top gas duct directing used cooling gas into said plurality of piping connected to said upper portion.

4. Apparatus according to claim 3, wherein said removing means comprises:

a burden feeder located on said bottom portion of said product cooler, for directing cold DRI material downward;

a seal leg connected to said burden feeder; and a discharge outlet for said cold DRI material, connected to said seal leg.

5. Apparatus according to claim 4, wherein said at least one storage unit further comprises a storage container in hermetic communication with said entry point by said transfer pipe, said hot DRI material being transferable through said transfer pipe by gravity to said at least one storage unit.

6. Apparatus according to claim 5, wherein said transfer pipe has a downward-sloping angle from said entry point of said product cooler, said transfer pipe being provided with a plurality of gas jets located along a lower portion of said transfer pipe, said gas jets inject being connected to a source of cooling gas for injection into said lower portion of said transfer pipe.

7. Apparatus according to claim 6, wherein said downward-sloping angle is equal to or greater than about 33 degrees below the horizontal.

8. Apparatus according to claim 5, further comprising means for causing said hot DRI material to move through said transfer pipe at a maximum flow rate of approximately less than 7 meters per second.

9. A method for transporting and cooling hot DRI material from a furnace for storage or use which comprises the steps of:

(a) discharging the hot DRI material from a furnace into a product cooler at an entry point located below the discharge point of the shaft furnace;

(b) transferring first portion of the hot DRI material from the entry point to a storage point exterior the product cooler, the storage point being below the shaft furnace, said transferring step being accomplished by establishing a gravitational flow of hot DRI through a transfer pipe hermetically connected at a downward sloping angle from the entry point of the product cooler to the storage point;

(c) allowing a second portion of the hot DRI material to descend by gravity flow directly into the product cooler, said second portion dropping through the product cooler to a bottom portion of the product cooler;

(d) injecting cooling gas at the bottom portion of the product cooler and causing the cooling gas to move upward through the product cooler countercurrent to the descending hot DRI material;

(e) removing cooling gas from the entry point of the product cooler;

(f) directing removed cooling gas from the cooler to a cooling gas scrubber, scrubbing and re-cooling the removed cooling gas for use in the injecting step; and (g) removing cooled DRI material from the bottom portion of the product cooler.

10. A method according to claim 9, wherein said transferring step further comprises:

(a) transferring a portion of the hot DRI material through the transfer pipe;

(b) providing at least one storage container at the storage point;

(c) connecting the storage container hermetically to the transfer pipe;

(d) injecting a portion of the cooling gas through gas jets in a bottom portion of the transfer causing pipe, the injected cooling gas to flow along the interior bottom portion of the transfer pipe, concurrently with the first portion of hot DRI material, and reducing the friction between the DRI material and the transfer pipe; and (e) hermetically removing hot DRI material from the bottom portion of the storage unit.

11. A method according to claim 9, further comprising dispersing the descending DRI within the product cooler by forcing the hot DRI material to an annulus between the cooler shell and a flow aid centrally located within the product cooler.

12. A method of transporting hot DRI from a shaft furnace to an exterior point for storage or use, which method comprises;

(a) discharging DRI from a shaft furnace to an entry point of a product cooler;

(b) transferring at least a portion of the hot DRI at the entry point to a storage point exterior of the product cooler, by establishing a gravitational flow of hot DRI through a transfer pipe hermetically connected from the entry point on the product cooler to the storage point, the gravitational flow of hot DRI being assisted by cooling gas injection into the transfer pipe;

(c) allowing dropping a descending portion of the hot DRI material to move by gravity flow directly into the product cooler;

(d) injecting cooling gas into the product cooler at the bottom portion of the product cooler, causing the injected cooling gas to move upward through the product cooler;

(e) dispersing the cooling gas upward and through the descending portion of the hot DRI material;

(f) removing cooling gas from the entry point of the product cooler;

(g) directing cooling gas from said removing step to a cooling gas scrubber, cooling, scrubbing, and cleaning the cooling gas for use in said injecting step; and (h) removing cooled DRI material from the bottom portion of the product cooler.

13. A method according to claim 12, wherein said transferring step further comprises:
   (a) piping a transfer portion of the hot DRI material through the transfer pipe at a velocity less than about 7 meters per second;
   (b) providing at least one storage container at the storage point;
   (c) connecting the storage container hermetically to the transfer pipe;
   (d) injecting a portion of the cooling gas through gas jets located in a lower portion of the transfer pipe, causing the injected cooling gas to flow concurrently along the transfer pipe with the transfer portion of hot DRI material, the cooling gas of said injecting step diverted from the product cooler; and
   (e) hermetically removing hot DRI material from the bottom portion of the storage unit.

14. A method of transporting hot DRI material from a shaft furnace to an exterior point for storage or use, which method comprises;
   discharging hot DRI material from a shaft furnace to an entry point of a product cooler;
   transferring at least a portion of the hot DRI material from the entry point to a storage point exterior of the product cooler;
   establishing a gravitational flow of hot DRI material through a transfer pipe hermetically connected to the product cooler and the storage point; and
   injecting a flow of gas into a lower portion of the transfer pipe, the injection of gas assisting gravitational flow by moving concurrently with the hot DRI material through the transfer pipe.

15. The method of claim 14, wherein said transferring step further comprises:
   (a) introducing a portion of the hot DRI material into the transfer pipe and causing it to move through the pipe at a velocity of less than about 7 meters per second;
   (b) providing at least one storage container at the storage point;
   (c) connecting the storage container hermetically to the transfer pipe;
   (d) receiving hot DRI material into at least one storage container; and
   (e) hermetically removing hot DRI material from the bottom portion of the storage unit.

* * * * *